Oct. 3, 1961   J. P. FELBURN   3,002,636
METHOD OF "PIGGIE-BACK" TRANSPORTATION
Original Filed May 5, 1958   4 Sheets-Sheet 1
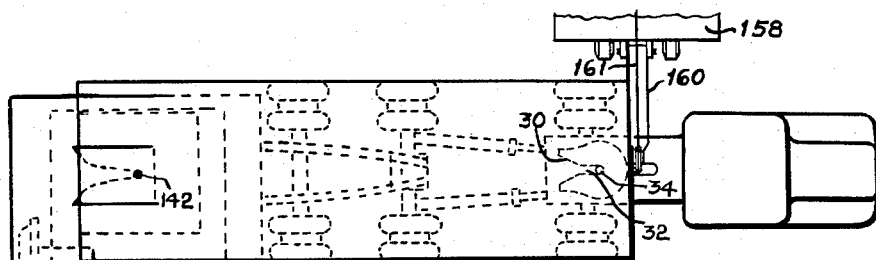
Fig. 1
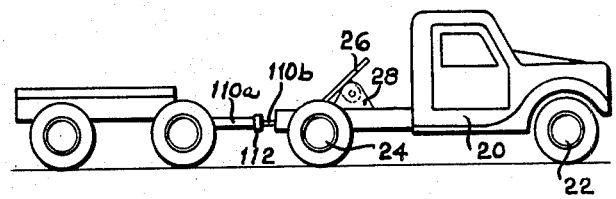
Fig. 5
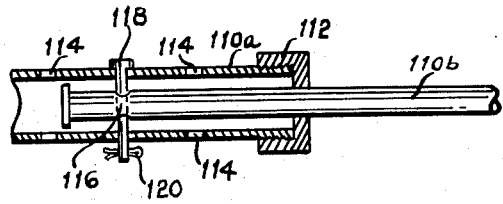
Fig. 6
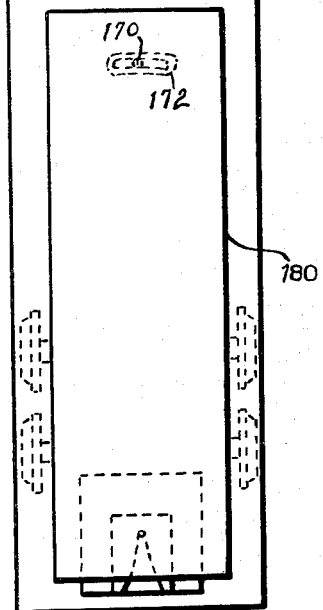
INVENTOR.
John Phil Felburn
BY
HIS ATTORNEYS

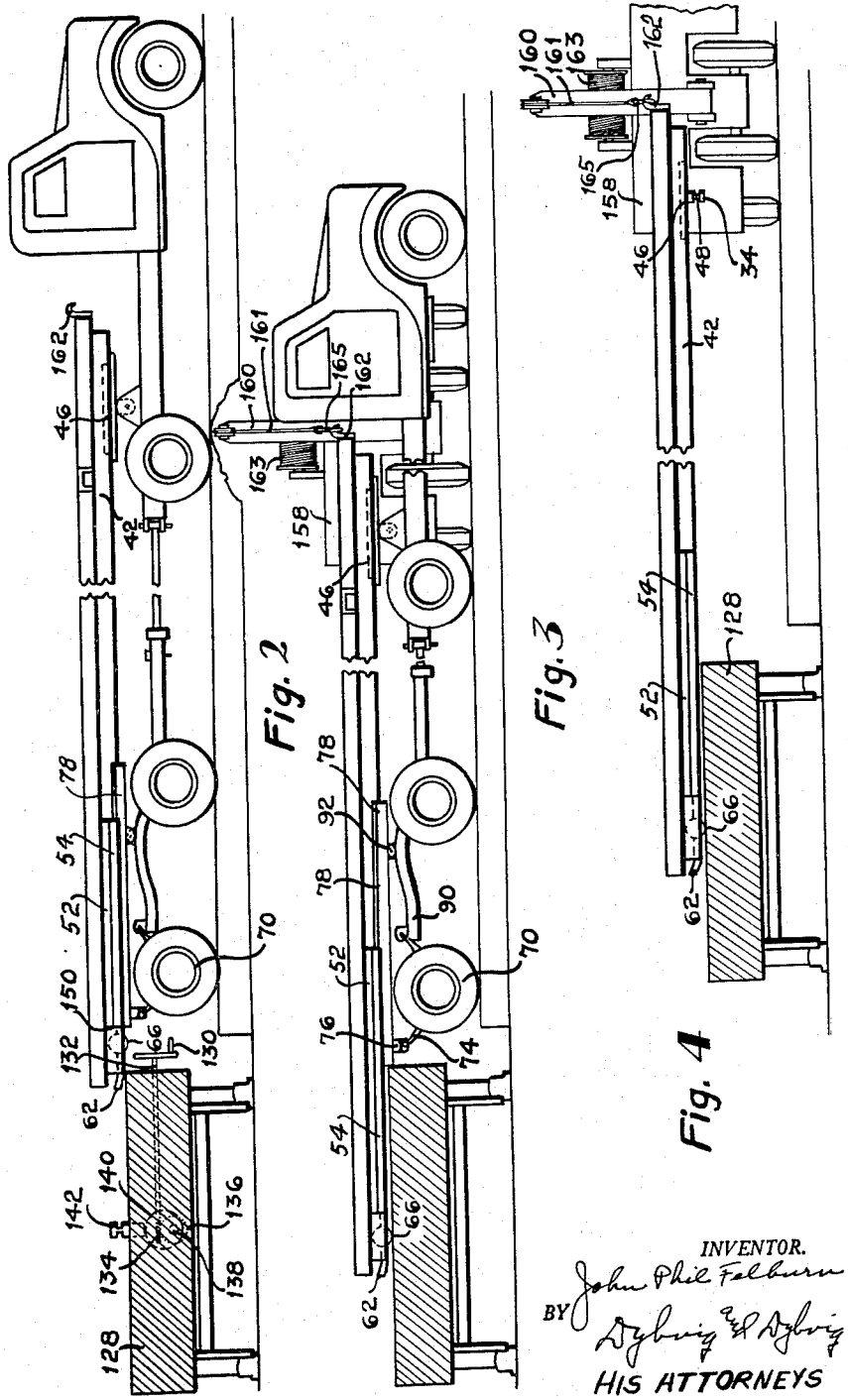

Oct. 3, 1961  J. P. FELBURN  3,002,636
METHOD OF "PIGGIE-BACK" TRANSPORTATION
Original Filed May 5, 1958  4 Sheets-Sheet 3
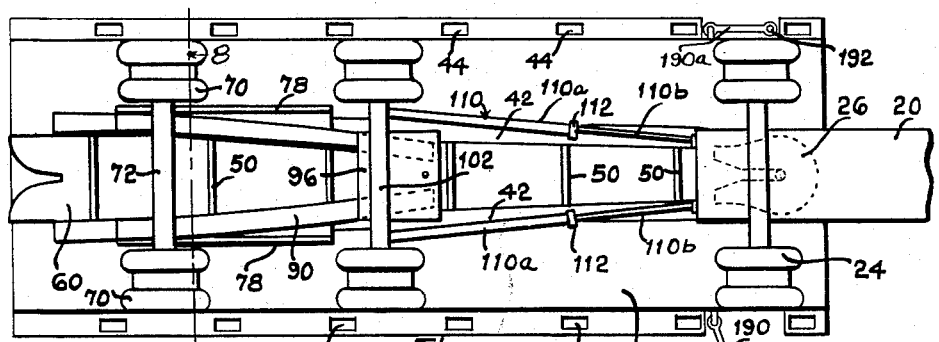
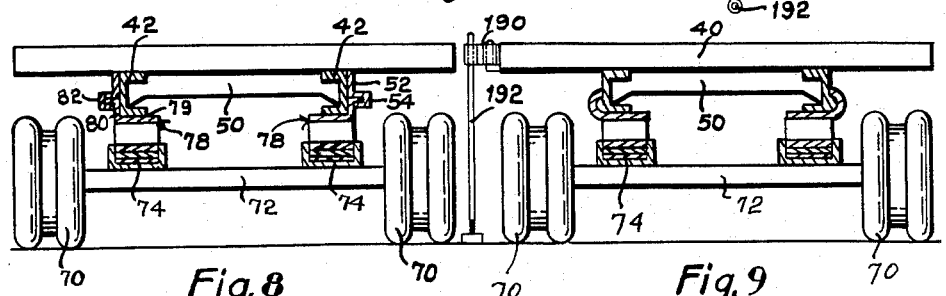
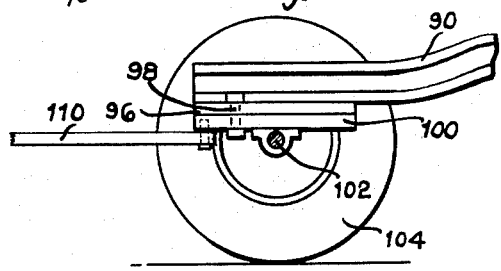
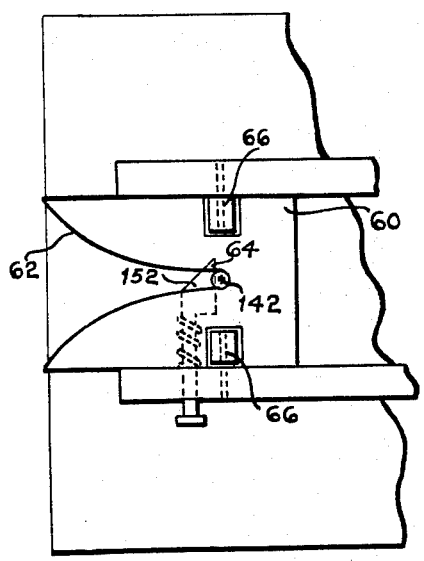
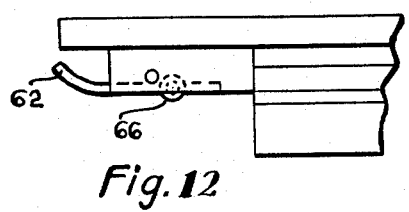
INVENTOR.
John Phil Felburn
BY
Dybvig & Dybvig
HIS ATTORNEYS Oct. 3, 1961          J. P. FELBURN          3,002,636

METHOD OF "PIGGIE-BACK" TRANSPORTATION

Original Filed May 5, 1958          4 Sheets-Sheet 4

INVENTOR.
John Phil Felburn
BY
Dybvig & Dybvig
HIS ATTORNEYS

United States Patent Office 3,002,636
Patented Oct. 3, 1961

3,002,636
METHOD OF "PIGGIE-BACK" TRANSPORTATION
John Phil Felburn, 4160 W. Broad St., Columbus 4, Ohio
Continuation of application Ser. No. 733,127, May 5, 1958. This application Mar. 22, 1960, Ser. No. 16,720
15 Claims. (Cl. 214—38)

This invention relates to a trailer assembly having a removably mounted running gear, so that the body of the trailer may be removed from the running gear and shipped either "piggie-back" or "fishy-back," although not necessarily so limited.

This application is a continuation application of my application Serial No. 733,127, filed May 5, 1958, for Method of "Piggie-Back" Transportation, now abandoned.

In the trucking business, it is quite desirable to have all of the equipment in use at all times and to keep the tractors and running gears in use for hauling freight as much of the time as possible. Furthermore, it is quite desirable to combine the transportation of freight first by truck, then by a common carrier such as by rail, or a barge or a ship and again, possibly by truck, that is, a truck being used at both ends of the common carrier haul, first to pick up the load and deliver it to the common carrier, then, at the end of the haul by the common carrier, to remove the load therefrom and deliver it to its ultimate destination.

An object of this invention is to provide a method wherein a trailer bed, either open or closed, is adapted to be used in material handling, beginning at the plant or place where the product is produced, then transported as a pallet, either to a storage room or directly to a running gear of a trailer, where it is mounted on the running gear, so as to be hauled by truck from the plant either directly to the point of distribution or to a terminal of a railroad for "piggie-back" freight transportation or to a barge or a ship for "fishy-back" transportation and, at the destination terminal of the "piggie-back" or "fishy-back" transportation is again loaded on a running gear if need be for transportation to the point of distribution, where the trailer body may again function as a pallet, for containing merchandise, either in a warehouse or in the open, until the merchandise has been disposed of to the ultimate trade or user. By this arrangement, economical use is made of the trailer bed and the running gear. In the event the freight is hauled by rail, the body of the trailer, which, in reality, is merely a crate or a box for the freight, is shipped. By mounting the trailer body directly on the flat car without the running gear, the trailer body when carried on a flat car being in direct contact with the bed of the flat car, it may be rigidly locked thereto by the use of conventional trailer king pins, the height being such that the load may be transported by rail through tunnels and under other overhead structures, in that the height of the trailer body and running gear is less than the height of the van of a conventional box car. Furthermore, the load may be so distributed that the heaviest load is directly above the trucks of the flat car and the lighter ends of the loads in the center of the flat car, thereby obtaining the optimum distribution of weight on the flat car if two bodies or vans are placed thereon rather than one as in the case of the use of the short car with single axled trucks. In the event the freight is shipped by conventional type ships, bodies may be transported on the deck of an oil tanker, or tanks for various types of liquids may be mounted on the deck of an ordinary freighter. Again, by separating the running gear from the trailer body, when a trailer body is moved upon the deck, it is possible to anchor the trailer body to the deck by a comparatively simple and economical mechanism, whereas if the trailer were to be transported on permanently attached wheels, the load would be top-heavy, subject to undue swaying and would tend to jar loose in storms and rough sea.

Another object of this invention is to provide a method utilizing a trailer body that is attachably mounted upon a running gear, the body being adapted to be shifted from the running gear of a trailer including a tractor to a common carrier without unloading the merchandise or freight from the trailer body, so as to carry it by "piggie-back" or "fishy-back" mode of transportation, without shipping the running gear, to permit the use of the running gear for collecting another load or hauling other freight while the body of the trailer containing the load is shipped by rail or water or is used as a pallet or storage container. This results in more freight haulage, in that it is not necessary to ship the running gear with the load, but merely the main body of a trailer.

Another object of this invention is to provide a method utilizing a tractor-trailer assembly, wherein the tractor may be used in shoving the end of the trailer upon a flat car or upon railroad bogie trucks, or upon a vessel properly equipped, the running gear being connected to the tractor by telescopically arranged bars so as to shorten the distance between the running gear and the tractor and increase the overhang distance between the rear of the bed and the rear wheels of the running gear forming a portion of the bed to be transferred to the flat car.

Another object of this invention is to provide a method utilizing a trailer that includes a demountable running gear, the rear end of the main body of the trailer being provided with a device simulating an inverted fifth wheel member that may be used in loading and positioning the trailer body upon a flat car, or upon a railroad bogie truck. This inverted fifth wheel member is provided with a V-shaped opening merging into a straight sided slot adapted to engage a king pin. This king pin is located in the center of the width of the flat car or upon the deck of a vessel properly equipped. The body may swivel about this king pin, so that the front end of the body may be positioned and securely fastened upon the flat car or bogie truck or vessel.

Another object of this invention is to provide a method utilizing a flat car having a removably mounted king pin-like structure near one end of the flat car and a receptacle near the center of the flat car for receiving and locking the conventional king pin in the front end of a trailer.

Another object of this invention is to provide a method of loading a trailer body mounted upon a demountable running gear, wherein the tractor is used to shove the rear end portion of the trailer upon equipment of a common carrier, the front end of the trailer being lifted by means of a suitable portable hoist mechanism, and swung into position, so that the main body of the trailer is aligned with the longitudinal axis of the flat car or other carrying means.

Another object of this invention is to provide a method of loading the bed from the running gear of a trailer upon a flat car, where the bed is backed from the side of the flat car until the bed balances upon the top of the flat car, the longitudinal axis of the trailer bed forming an angle with respect to the longitudinal axis of the flat car, the running gear is removed, thereafter the trailer bed or body is rotated so as to align the longitudinal axis of the trailer body or bed with the longitudinal axis of the flat car.

Another object of this invention is to provide a method utilizing a conventional railroad bogie truck with means simulating fifth wheel members on tractors, but doubled and in reverse relation to each other, whereby the trailer body may have one end connected to one end of a railroad bogie truck and the other end connected to the end of another railroad bogie truck, so that the trailer body together with the railroad bogie trucks form a railroad vehicle simulating a railroad freight car.

Other objects and advantages reside in the construction of parts, the combination thereof, the method of manufacture and the mode of operation, as will become more apparent from the following description.

Referring to the drawings, FIGURE 1 is a top plan view of a road trailer provided with a demountable running gear, the gear of the trailer being forced rearwardly upon a flat car.

FIGURE 2 is a side elevational view of a trailer and tractor and an end view of a flat car in section.

FIGURE 3 is another side elevational view of a trailer mounted upon a demountable running gear and the tractor, showing the body of the trailer moved part way upon a flat car shown in section.

FIGURE 4 is another side elevational view of the main body of the trailer having one end positioned upon a flat car, shown in section, and the other end supported by a hoist mounted upon a lift truck, the demountable running gear and the tractor having been removed.

FIGURE 5 is a side elevational view of the tractor and the running gear, the running gear being coupled close to the tractor.

FIGURE 6 is a fragmentary, longitudinal view of coupling bars telescopically arranged with respect to each other.

FIGURE 7 is a bottom plan view of the trailer and the rear end of the tractor shown schematically.

FIGURE 8 is a cross sectional view, taken substantially on the line 8—8 of FIGURE 7.

FIGURE 9 is a cross sectional view similar to FIGURE 8, showing a modification.

FIGURE 10 is a fragmentary, enlarged view of the steerable wheels of the running gear.

FIGURE 11 is an enlarged view looking up at the under side of the rear end of the trailer.

FIGURE 12 is a side elevational view of the rear end of the trailer.

Figures 13, 14, 15:
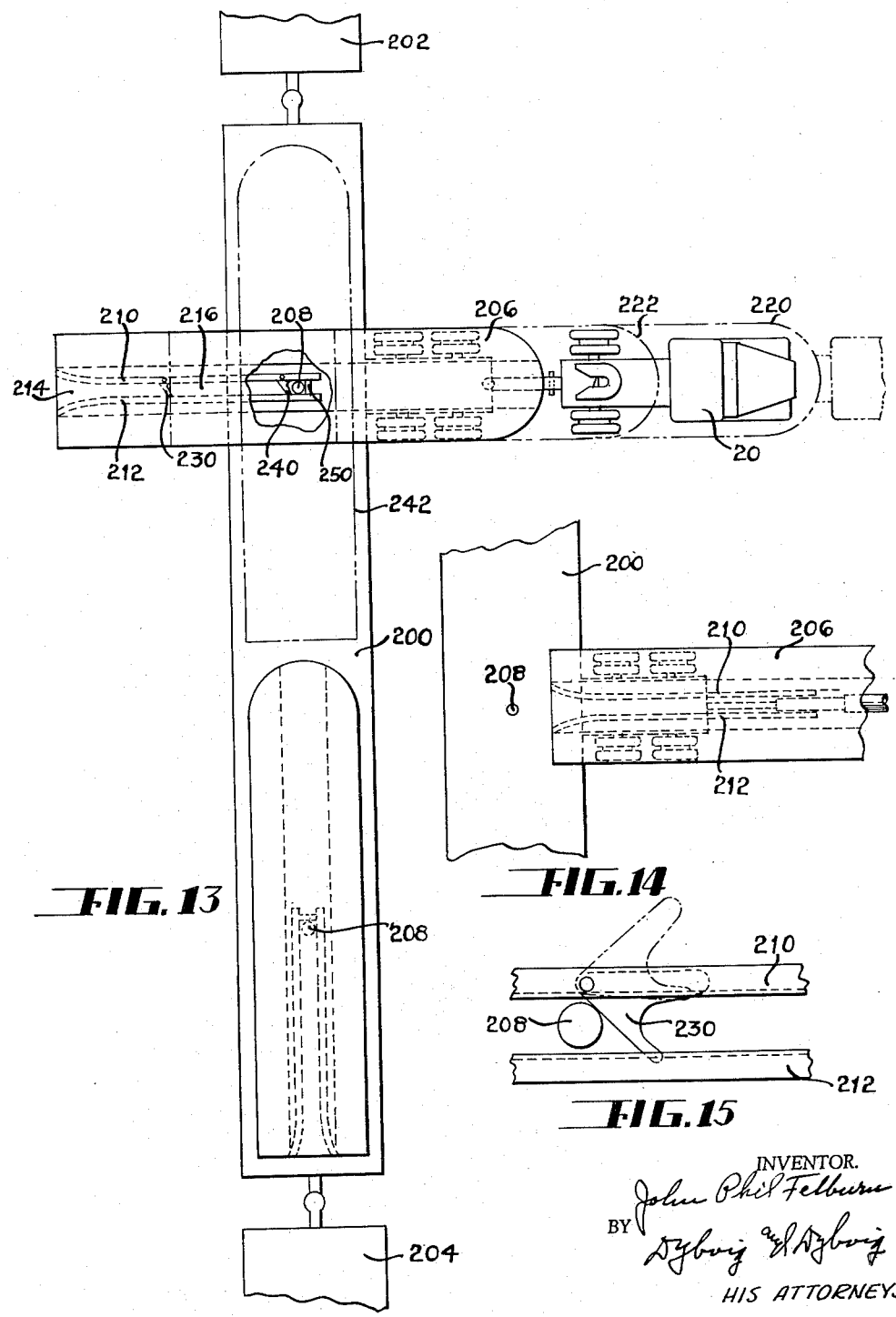

FIGURE 13 discloses a modification of a trailer assembly and a flat car, with parts broken away, wherein the trailer bed may be mounted in balanced relation transversely upon the flat car.

FIGURE 14 is a fragmentary detail view showing the rear end of the trailer bed resting upon the flat car.

FIGURE 15 is a fragmentary detail view of a latch mechanism.

Tractor

The tractor 20 may be any conventional truck tractor provided with front steerable wheels 22 and rear drive wheels 24. The rear end of the tractor supports a fifth wheel member 26 pivotally mounted upon suitable brackets 28. The fifth wheel member 26, as is best seen in FIGURES 1 and 7, is provided with a V-shaped throat 30 merging into a slot 32 having parallel sides receiving a king pin 34 of a trailer, the king pin being best seen in FIGURE 4. A suitable latch is provided for holding the king pin in position, which has not been shown, but is well known to those skilled in the art. The trailer assembly consists essentially of two parts, namely, the main body or load carrying bed and a demountable running gear.

Main body or bed of trailer

The main body or bed of the trailer consists of a floor 40 mounted upon two longitudinally extending frame members or channel members 42. The distance between these channel members may taper slightly from the front to the rear, that is, they may be 34" wide in the front and 38" wide in the rear. The body or bed may be a stake type body, as shown in FIGURE 7, the margins of the body being provided with openings 44 for receiving the stakes. Instead of a stake type bed, the body may be enclosed, so as to house the freight. The front end of the trailer is provided with a king pin 34, mounted in a suitable plate 46 extending between the two lower flanges of the channel members 42 and welded thereto. This king pin 34 is provided with an annular slot 48 that is used in locking the king pin 34 to the fifth wheel member 26 of the trailer. The channel members 42 may be braced at spaced intervals by cross braces 50. A member 52 is fixedly secured by sliding engagement to the outside of each channel member 42 near the rear end thereof. As seen in FIGURE 8, the lower margin of member 52 merges into a hook-shaped or channel-like portion 54, adapted to receive a portion of the undercarriage of the running gear, which will be described more fully later.

As best seen in FIGURES 7 and 11, the rear end of the body 40 is provided with a plate 60 having a tapering throat 62 merging into a substantially parallel slot portion 64. As clearly shown in FIGURES 2, 3, 4, 11 and 12, the margins of the plate 60 are welded to the lower inwardly directed flanges of the frame members 42, so that the lower surface of the plate 60 is flush with the lower surface of the frame members 42. A pair of rollers 66 is also located near the rear end of the body, the rollers 66 projecting below the channel or frame members 42. The axis of rotation of the rollers 66 intersects the king pin 142 which is adjustably attached to the flat car. The pointed ends adjacent the tapering throat 62 of the plate 60 are deflected upwardly, as clearly shown in FIGURE 12, so as to form an inclined plane or a cam, as will appear more fully later.

The main body of the trailer is adapted to be supported on a tractor or other wheeled vehicle and a running gear when used for hauling freight by truck and adapted to be mounted on a railway car or railroad bogie truck when used for shipping freight by rail, or upon the deck of a ship. The running gear assembly will now be described.

Running gear assembly

The running gear of this embodiment consists of a pair of rear non-steerable wheels 70, rotatably mounted upon an axle 72. The axle 72 is mounted under leaf springs 74 and attached thereto. The rear ends of the leaf springs are attached by shackles 76 mounted upon longitudinally mounted undercarriage frame members 78.

As clearly shown in FIGURE 8, these frame members 78 consist of a horizontal portion 79 underlying the channel members 42 and an upwardly directed flange portion 80, merging into an outwardly directed flange portion 82 seated in the channel-like portion 54 of member 52. The undercarriage frame member 78 and the channel members 42 are held together in proper fixed spaced relation, as far as vertical movement is concerned, by the flange portion 82 seated in the channel-like portion 54. The undercarriage frame members 78 are not restrained from longitudinal movement with respect to the frame members 42. The undercarriage is free to move longitudinally with respect to the channel members 42.

The forward end of each leaf spring 74 is attached to the rear end of a walking beam 90, pivotally attached at 92 to the undercarriage 78, the forward end of the walking beam 90 being fixedly secured to a transverse plate 96, as shown in FIGURE 10.

This plate 96 is provided with a king pin 98 pivotally supporting a plate 100, fixedly attached to the axle 102, having journalled thereon steerable wheels 104. The king pin 98 is located ahead of the axle 102, so as to provide a bogie truck assembly that functions as a controlled caster, that is, the bogie truck assembly includes the steerable wheels 104, the axle 102 and the plate 100.

As may be clearly seen by referring to FIGURE 7, the walking beams 90 taper from the rear towards the front, so that at the rear end the spacing of the walking beams 90 is substantially equal to the spacing of the frame members 42; but at the front end, the walking beams converge toward each other so that there is only a short distance between the front ends of the walking beams 90 allowing wheel clearance to turn.

The relative position of the fixed axle 72 to the springs 74 and the pivotal attachment of the walking beams 90 to the undercarriage frame members 78 has been so proportioned that there is equal weight distribution on the several axles supporting a uniformly distributed trailer load.

Steering mechanism of running gear

As clearly seen in FIGURE 10, duo-functional tow and steering bars or rods 110 are pivotally atached at the rear end to the plate 100 fixedly attached to the axle 102. As best seen in FIGURES 6 and 7, each of the bars 110 includes a rear enlarged tubular portion 110a, terminating in a capping member 112 and a telescopically arranged bar 110b. The bars 110a and 110b are provided with apertures 114 and 116 respectively, adapted to receive a removably mounted pin 118. This pin may be secured in position by the use of a suitable cotter pin 120. By selecting the proper aperture 114, the proper distance may be obtained between the axle 102 and the rear end of the frame of the tractor 20. The forward ends of the bars 110b are pivotally attached to the rear end of the tractor 20. Instead of being connected to the rear end of the frame of the tractor 20, the forward ends of the rods 110 may be connected to a plate non-rotatably mounted upon the fifth wheel member of the tractor. A conventional tandem axle with a single telescoping draw bar is disclosed in my United States Letters Patent No. 2,693,889, patented November 9, 1954, for Trailer With Detachable Load Platform.

It is to be noted that the bars 110 diverge rearwardly from the end of the tractor 20, so that the distance between the pivotal connections of the bars 110 to the tractor is less than the distance between the pivotal connection of the bars 110 to the plate 100 fixedly attached to the axle 102. This is clearly seen from an analysis of the movement of all the parts affecting the steering of the steerable wheels. When the tractor 20 begins negotiating a curve to the right, the right bar 110 moves rearwardly and the left bar 110 moves forwardly when the pins 118 extend through holes 114 and 116. As the front end of the right bar approaches the longitudinal center line of the trailer, the front end of the right bar moves substantially transversely. The left bar, however, moves forwardly at a very great rate. As soon as the front end of the right bar passes the longitudinal center line of the trailer, both bars move forwardly as the curvature of the turn is increased. Obviously, when both bars move forwardly, the running gear is also pulled forwardly by the steering bars 110, which also function as tow bars, to thereby advance the running gear with respect to the body of the trailer. When straightening the tractor with respect to the trailer, the reverse takes place and the body of the trailer is receded with respect to the running gear. This results in the steerable wheels tracking without any substantial amount of skidding when negotiating a curve. The relative distance between the spacing of the pivots at the ends of the bars 110, is dependent upon a number of factors, such as the length from the non-steerable wheels of the running gear to the non-steerable wheels of the tractor and to the relative positioning of the steerable wheels under the trailer with respect to the non-steerable wheels of the running gear.

In addition to steering the steerable wheels of the running gear, the bars 110 also function as tow bars for towing the running gear, in that the running gear is loosely mounted under the trailer. In negotiating turns or curves, the distance between the tractor and the running gear will differ slightly. That being the case, when negotiating a curve, there will be a relative movement between the running gear and the rear end of the trailer. This slippage eliminates the necessity for a slot in the plate 96, as has been described in my United States Letters Patent No. 2,433,269, patented December 23, 1947, for Transportation Vehicle. When the running gear has been properly positioned on the rear end of the trailer and the tractor attached to the front end through the fifth wheel on the tractor, the pins 118 are then located in proper apertures for use with a trailer body, so as to maintain a constant length of the steering and tow bars. The bars 110 are shortened when towing the empty running gear by inserting the pins 118 in properly selected apertures 114 and 116. As clearly seen in FIGURE 10, the pivot pin or king pin 98 may be located ahead of the axle 102, so that the steerable wheels function as controlled caster wheels while driving in a forward direction.

"Flat car," as used herein, designates a railway car wherein the platform lies in a common plane throughout the load carrying area with the exception of a king pin or king pins projecting upwardly from the load carrying area or projecting downwardly into recesses provided therefor in the load carrying area.

Method of loading a flat car

If the body of the trailer is to be shapped on a flat car 128, the tractor, the trailer bed and the running gear are backed up to the side near one end of the flat car. As clearly shown in Figures 1 and 2, this flat car 128 is provided with an upwardly directed king pin or pivot pin 142 that may be raised or lowered, as the case may be, by means of a crank 130 mounted on the lower end of a shaft 132. The inner end of the shaft 132 has a worm 134 meshing with a worm gear 136 keyed to a shaft 138 having mounted thereon an eccentric cam 140 adapted to raise and lower a king pin 142. When the flat car is used for hauling other types of freight, the king pin 142 may be lowered by rotating the eccentric cam 140 by actuating the crank 130, so as to drop the king pin below the level of the top of the flat car. However, when the trailer is to be hauled on the flat car, the king pin is then raised into the position shown in FIGURE 2. The trailer bed, the running gear and the tractor are backed until the rear end 150 of the running gear engages the side of the flat car. The pins 118 are then removed, so as to permit the telescopic bars 110b to slide into the larger tubular bars 110a. The running gear cannot move; but the tractor can shove the trailer bed upon the flat car, as shown in FIGURE 3, until the king pin 142 is seated in the end of the slot portion 64 of the plate 60, at which time a latch member 152 locks the king pin 142 to the rear end of the trailer. It is to be noted that in order to facilitate the movement of the trailer body upon the flat car, the load is carried upon the rollers 66 as soon as the rollers engage the floor of the flat car.

When the king pin 142 has been properly seated and locked in position, a motorized auxiliary hoist 158 is used in supporting the front end of the trailer bed. The hoist is provided with a suitable boom 160 and a cable 161 extending from a winch 163. The end of the cable 161 is provided with a ring 165 that engages a hook 162 in the front end of the trailer bed. The boom 160, the cable 161 and the winch 163 are mounted upon a suitable steerable vehicle 158, shown schematically in FIGURES 3 and 4, the front end of the trailer being supported upon the boom 160, at which time the tractor 20 and the running gear may be pulled ahead, leaving the trailer bed with the rear end supported upon the freight car and the front end supported from the boom 160.

After the tractor and running gear have been removed, the trailer bed may then be swung through 90°, or whatever the angle may be, by means of the steerable hoist 158 into the dotted position shown in FIGURE 1. The king pin 34 rests in an aperture 170 provided therefor in the flat car. This aperture 170 is bounded by an arcuate groove 172, which guides the king pin into the aperture 170. As soon as the king pin 34 has been seated in the aperture 170, a bifurcated locking member or retaining means 174, shown schematically in FIGURE 1, is actuated, so as to engage the annular groove 48 in the king pin 34, to lock the king pin in the floor of the flat car. It can readily be seen that both ends of the trailer are then rigidly secured to the flat car and cannot swing sidewise and cannot swing endwise. In loading the trailer, it is preferable to place the heaviest load on the rear end of the trailer, so as to facilitate the handling of the front end of the trailer in rotating the front end of the trailer from the full line position, shown in FIGURE 1, to the dotted position shown in FIGURE 1 and also carrying the heaviest load directly over the railroad trucks.

In this same figure, another trailer body 180 is also shown on the opposite end of the flat car. The length of the trailer beds in such that two beds may be hauled on a conventional flat car. From this it can readily be seen that the tractor 20 is utilized to supply power to move the rear end of the trailer upon the flat car. Whenever the rear end of the trailer bed has been loaded upon the flat car and locked thereto, then the front end may be actuated by means of a suitable hoist or crane mechanism that has been motorized and is self-propelled, to swing the trailer body from the full line position to the dotted position.

Unloading trailer bodies from flat cars

When the flat car together with the trailer body reaches the destination, it is then necessary to unload the trailer body from the flat car. This is done by an operation reverse to that of loading the trailer body on the flat car. First, the retaining means 174 is released from the king pin 34 carried under the front end of the trailer body. A motorized hoist like the hoist 158 is used in lifting the forward end of the trailer body upwardly, so as to cause the king pin 34 to be removed from the aperture 170, the motorized hoist then swinging the front end of the trailer body into position at right angles to the longitudinal axis of the flat car, the trailer body being swivelled about the pivot pin 142.

While the front end of the trailer body is supported by the motorized hoist, the running gear is then backed under the trailer body. The rear end of the running gear abuts the side of the flat car. The front end of the trailer body is then lowered to a suitable height so as to cause the fifth wheel member 26 on the tractor to engage the king pin 34 of the fifth wheel member mounted under the front end of the trailer body. The rear wheels and the steerable wheels of the running gear will then be in the position shown in FIGURE 1. As best seen in FIGURE 11, the latch 152 engaging the king pin 142 is then released and the motorized hoist is disconnected from the front end of the trailer, in that the front end of the trailer is then supported upon the fifth wheel member 26 of the tractor and locked thereto. The trailer body is then towed by the tractor. The pins 118, having been disconnected from the steering rods 110, permit the tractor to pull the body of the trailer from the end of the freight car, the wheels of the running gear either being blocked or a brake applied thereto, so that the running gear remains stationary until such time that the steering rods 110 have been extended into the desired full length position, when the pins 118 are again inserted into apertures 114 and apertures 116, so as to lock the two telescoping members 110a and 110b together. The trailer may then be towed to its ultimate destination. Again, the tractor and the running gear may be disconnected from the trailer by supporting the front end of the trailer upon suitable landing gears 190 shown in FIGURES 7 and 9, and the rear end upon any suitable support which may be provided with a king pin 142 as in FIGURE 1.

In the embodiment shown in FIGURE 1, as described above, the rear end of the truck is backed upon the flat car and then the front end is supported independently of the tractor and the undercarriage while the tractor and the undercarriage are withdrawn.

In the modification disclosed in FIGURES 13, 14 and 15, the trailer bed 206 is backed upon a flat car 200, so that the center of the longitudinal length of the bed is positioned in balanced relation on the flat car, so that the longitudinal axis of the flat car intersects the longitudinal axis of the bed in the center thereof. The method of loading and unloading of the trailer bed upon the flat car will now be described.

A flat car 200 connected to the flat cars 202 and 204, in other words, a flat car selected from a string of flat cars forming a train, has been shown. This flat car 200, if it has sufficient length, may be provided with a pair of upwardly directed pins 208 simulating king pins. The trailer bed is provided with a pair of guide rails 210 and 212 providing a V-shaped opening 214 near the rear end of the trailer bed and a longitudinal slot 216 merging into the V-shaped opening 214. The guide rails 210 and 212 extend from the rear end under the center of the longitudinal length of the trailer bed. The undercarriage is mounted on this trailer bed in the same manner as the undercarriage described in connection with FIGURE 1. The trailer bed is backed over the position 220, shown in dot-dash, the undercarriage abutting against the side of the flat car, as shown in FIGURE 14, the trailer bed being backed into the position shown in the dotted lines 222 when the tow bars 110 have been contracted as far as they will go.

By this arrangement, a latch member 230 engages the pin 208, so as to prevent withdrawal of the trailer bed from the flat car. In other words, the latch member 230 engages the king pin 208 in such a manner as to prevent withdrawal of the bed. The tractor 20 is then disconnected from the king pin 34 of the trailer bed. The running gear is then positioned under the front end of the trailer bed and locked in position in any suitable manner. By this arrangement, sufficient clearance is provided between the rear end of the running gear and the flat car to permit the tractor, through the running gear, to back the bed 206 into the full line position shown in FIGURE 13, when a second latch 240 engages the king pin 208 so as to lock the trailer bed in a balanced position on the flat car, assuming that the load upon the trailer bed is balanced. In other words, the trailer bed projects substantially an equal distance to both sides of the flat car. Instead of one latch 230 being used, several latches may be used in the event more than two stages of backing the trailer bed upon the flat car are used. The running gear is then withdrawn from the bed 206.

The bed may then be rotated in any suitable manner, either manually or by power, possibly using a tow bar, into the dot-dash position 242 shown in FIGURE 13. The ends of the trailer bed may be anchored to the flat car in any suitable manner, the center of the bed being anchored to the pin 208 and held in this position between the latch 240 and the cross bar 250.

The guide rails 210 and 212 may be welded to the longitudinal rails or beams supporting the floor of the bed, these rails or beams extending throughout the length of the bed or substantially so, as is well known to those skilled in the art.

In unloading a flat car, disclosed in FIGURE 13, the bed may be rotated through substantially 90°, the undercarriage backed under the front end of the trailer bed, locked thereto, then by releasing the latch 240, the trailer bed may be withdrawn until the pin 208 is locked to the rear of the latch 230 which may be reversed so as to prevent the bed from being returned to the balanced position while the undercarriage is backed under the bed into a position where the fifth wheel member of the tractor 20 may engage the king pin usually found under the front end of the trailer. Then the bed may be completely withdrawn from the flat car.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of transferring a trailer body from a trailer having a removably attached undercarriage, the trailer body having a king pin on the front end thereof and swivel means located rearwardly of the king pin cooperating with swivel means on the floor of the flat car when the two swivel means are brought into registry, also including the use of a towing vehicle, said method including the steps of backing the rear end of the trailer body upon the side of the flat car, registering the swivel means under the trailer body with the swivel means on the flat car to form a pivot, locating a towing vehicle to one side of the front end of the trailer body, attaching the towing vehicle to the front end of the trailer body and relieving the weight of the trailer body from the tractor and undercarriage, removing the undercarriage from the trailer body, supporting the trailer body solely upon the flat car and upon the towing vehicle, swinging the trailer body by the use of the towing vehicle so as to align the longitudinal axis of the trailer body with the longitudinal axis of the flat car, disconnecting the towing vehicle from the trailer body so as to support the trailer body in direct contact with and upon the floor of the flat car, and locking the king pin to the flat car to hold the front end of the trailer body in locked position upon the flat car.

2. The method of transferring a trailer bed from a tractor drawn trailer having a removably attached undercarriage, the trailer bed having a plate on the under side thereof, the plate being provided with a rearwardly directed V-shaped slot, to a flat car having a king pin projecting upwardly from the floor of the flat car including the use of a towing vehicle, said method including the steps of backing the rear end of the trailer bed upon the side of the flat car by the tractor until the V-shaped slot in the plate is seated upon the king pin in the flat car, locking the king pin in the slot, attaching the towing vehicle, which is offset from the tractor, to the front end of the trailer bed, removing the undercarriage from the trailer bed, supporting and controlling the trailer bed solely upon the flat car and the towing vehicle, swinging the trailer bed by the use of the towing vehicle so as to align the longitudinal axis of the trailer bed with the longitudinal axis of the flat car, and disconnecting the towing vehicle from the trailer bed so as to support the trailer bed in direct contact with and upon the floor of the flat car.

3. The method of transferring a trailer bed from a tractor drawn trailer having a removably attached undercarriage, the trailer bed having swivel means mounted on the under side thereof, to a flat car having swivel means complementing the swivel means on the under side of the trailer bed, so that the two swivel means cooperate to form a pivot, including the use of a towing vehicle, said method including the steps of backing the rear end of the trailer bed upon the side of a flat car, registering the swivel means so as to provide a pivot for the trailer bed with respect to the flat car, connecting the towing vehicle, which is offset from the tractor, to the front end of the trailer bed, removing the undercarriage from the trailer bed by the use of the tractor, supporting and controlling the trailer bed solely upon the flat car and the towing vehicle, swinging the trailer bed by the use of the towing vehicle so as to align the longitudinal axis of the trailer bed with the longitudinal axis of the flat car, and disconnecting the towing vehicle from the trailer bed so as to support the trailer bed in direct contact with and upon the floor of the flat car.

4. The method of transferring a trailer bed from a tractor drawn trailer having a removably attached under carriage, the trailer bed having a king pin on the front end thereof and swivel means located rearwardly of the king pin cooperating with swivel means on the floor of the flat car when the two swivel means are brought into registry, said method including the use of a towing vehicle, said method including the steps of backing the rear end of the trailer body upon the side of the flat car by use of the tractor, registering the swivel means under the trailer bed with the swivel means on the flat car to form a pivot, attaching the towing vehicle, which is offset from the tractor, to the front end of the trailer bed, removing the undercarriage from the trailer bed by the tractor, supporting the trailer bed solely upon the flat car and upon the towing vehicle, swinging the trailer bed by the use of the towing vehicle so as to align the longitudinal axis of the trailer bed with the longitudinal axis of the flat car, disconnecting the towing vehicle from the trailer bed so as to support the trailer bed in direct contact with and upon the floor of the flat car, and locking the king pin to the flat car to hold the front end of the trailer bed in locked position upon the flat car.

5. The method of transferring a trailer bed from the running gear of a tractor drawn trailer to a flat car, said trailer bed having a king pin projecting downwardly from the front end thereof, and a plate member having a V-shaped throat associated with a latch for engaging a pivot pin simulating a king pin near the rear end thereof, said flat car having an upwardly projecting pivot pin simulating a king pin, the running gear being slidably connected to the trailer bed and provided with towing rods telescopically arranged so as to permit shortening of the distance between the trailer running gear and the tractor, and a towing vehicle, said method including the steps of backing the tractor and the trailer so as to push the rear end of the trailer bed upon the flat car to position the V-shaped throat of the rear end of the trailer bed upon the pivot pin, the bed of the trailer being in direct contact with the top of the flat car, attaching the towing vehicle, which is offset from the tractor, to the front end of the trailer bed, withdrawing the tractor and the running gear from the trailer bed, supporting the trailer bed solely by the flat car and the towing vehicle, swinging the front end of the trailer bed by the towing vehicle so as to swivel the trailer bed about the pivot pin of the flat car to align the bed of the trailer with the longitudinal axis of the flat car, and anchoring both ends of the trailer bed to the flat car.

6. The method of transferring a trailer bed from the running gear of a trailer to a flat car according to claim 5, wherein the trailer bed is provided with a pair of rollers projecting a short distance below the trailer bed, said rollers being located near the rear end of the trailer bed, said method including the steps of supporting the rear end of the trailer bed upon the rollers and swinging the trailer bed while supported upon the rollers into alignment with the longitudinal axis of the flat car.

7. The method of making shipments by truck and rail, wherein a tractor drawn trailer comprises a load carrying bed having a front end detachably supported on said tractor and the rear end supported on a running gear which is selectively removable from said bed, said bed having a plate mounted on the underside thereof, said plate having a rearwardly directed V-shaped slot, said method utilizing a towing vehicle, the method including the transferring of said bed from the running gear and from the tractor to a railway flat car having an upwardly directed king pin, which method comprises shoving the rear end of the bed upon the flat car, disconnecting the running gear from its normal load carrying position, shoving the bed further upon the flat car to position the upwardly directed king pin in said slot, locking the king pin in the slot, attaching the towing vehicle to the trailer bed, which towing vehicle is offset from the tractor, disconnecting the tractor with a portion of the bed projecting beyond the outer margin of the flat car, supporting the bed solely upon the flat car and the towing vehicle, rotating the bed about said king pin upon the flat car with the longitudinal axis of the bed extending parallel to the longitudinal axis of the flat car.

8. The method of making shipments including the use of a trailer having a load-carrying bed which has its rear end supported on a running gear that is selectively movable under and forwardly of said bed from normal load-carrying position at the rear of said bed to a forward position where it is disconnected from said bed, said bed having a recess on its under surface tapering from a mouth directed to the rear of said bed and merging into a longitudinal slot extending forwardly at least to the center of the longitudinal axis of the bed, and further including the use of a flat car having an elongate load-supporting platform for receiving said bed, said flat car being provided with a vertically extending pivot member projecting upwardly from the surface of the floor of the flat car, said method comprising the steps of backing the trailer so as to project the rear end of the bed over the top of the flat car with the pivot member positioned in said slot, and abutting said running gear against a side of said flat car, shoving the rear end of said bed upon said flat car, and simultaneously moving said running gear towards the forward end of the bed, the backing of the bed being accomplished by several steps, and holding the bed from forward movement between the steps until the bed is shoved into a balanced position transversely of the flat car, removing the running gear from the bed, and rotating the bed about said pivot member to align the bed with the longitudinal axis of the flat car.

9. The method of transferring a trailer bed from a running gear of a tractor drawn trailer to a flat car, said trailer bed having a pair of guide members forming a V-shaped throat merging into a longitudinally extending slot terminating ahead of the center of the longitudinal axis of the bed, said slot being associated with a latch for engaging a pivot member projecting upwardly from the flat car and being located in the longitudinal axis extending along the center of the flat car, the running gear being slidably connected to the trailer bed, said method including the steps of backing the tractor and the trailer bed so as to push the rear end of the trailer bed upon the flat car to position the V-shaped throat of the rear end of the trailer bed upon the pivot member, the bed of the trailer being in direct contact with the top of the flat car, the running gear abutting the side of the flat car and shoved forwardly as the bed is backed upon the flat car, said backing taking place in several steps, holding the bed against movement from the flat car between the backing steps, withdrawing the running gear and the tractor from the trailer bed after the pivot member has been positioned in the slot near the center of the longitudinal axis of the bed, supporting the trailer bed in a balanced relation upon the flat car, locking the pivot member in the slot by said latch, and swinging the bed about the pivot member so as to align the longitudinal axis of the trailer bed with the longitudinal axis of the flat car.

10. The method of making shipment including the use of a trailer having a load carrying bed which has its rear end supported on a running gear that is selectively movable under and forwardly of said bed from normal load carrying position at the rear of said bed to a forward position where it is disconnected from said bed, said bed having a pair of spaced guides on its undersurface forming longitudinal guides extending from the rear end of the bed forwardly at least to the center of the longitudinal axis of the bed, and further including a railway car having a load supporting platform for receiving said bed, said car being provided with a vertically extending pivot member in the platform, said pivot member being located in the longitudinal axis of the car, said method comprising the steps of backing the trailer towards the side of the car, arresting the movement of the running gear, continuing the backing of the trailer while the running gear is arrested so as to project the rear end of the bed over the top of the platform with the pivot member between said guides until the trailer bed is moved into a substantially balanced position transversely of the car, disconnecting the running gear from the bed by the relative movement of the bed and the running gear, latching the trailer bed to the pivot member, and rotating the bed about said pivot member to align the bed with the longitudinal axis of the car.

11. A method of making shipments through the utilization of rail and truck transportation and involving the use of a railway flat car and a semi-trailer having a load-carrying bed detachably connected at its front end to a tractor unit and having a stable multiple axle wheel unit provided with an upper portion detachably locked in position underneath the rear part of the bed whereby the latter is conjointly supported by said wheel and tractor units for movement along a roadway, said method including the steps of backing the semi-trailer by means of the tractor in a direction generally normal to the longitudinal axis of the railway flat car to a position wherein the rear end of said bed adjoins and is generally level with the adjacent upper surface of said flat car and wherein the rear set of wheels of said wheel unit adjoins the side of said flat car, stopping the backing movement of said tractor unit and unlocking said wheel unit from said load-carrying bed to permit relative movement therebetween, then continuing the backing movement of said tractor unit while said wheel unit is held stationary to push against the forward end of said bed and thereby move said bed smoothly over the horizontally stable upper portion of said stationary wheel unit and onto said flat car to transfer support of the load from said wheel unit to said flat car, the wheel unit by reason of its stability remaining horizontal and untilted and permitting unobstructed movement of said load-carrying bed relative to said wheel unit without considerable separation therebetween, disconnecting said tractor unit from said bed, and swinging said bed horizontally and relative to said flat car to a position wherein its longitudinal axis is generally aligned with the longitudinal axis of the flat car.

12. The method of claim 11 and further including the steps of connecting a towing and lifting vehicle to the front end of said load-carrying bed and lifting the front end to relieve said tractor unit from support of the load and utilizing the motive action of said towing and lifting vehicle to swing said bed horizontally.

13. The method of claim 11 and further including the step of longitudinally pushing said bed crosswise of said flat car to a position wherein opposite ends of said bed extend substantially equal amounts beyond opposite sides of said flat car, and thereafter carrying out the said step of swinging said bed horizontally.

14. The method of claim 11 and further including the steps of engaging the load-carrying bed with a vertically extending pivot member on said flat car at the time said bed is moved over and onto the latter, and thereafter carrying out the said step of swinging said bed horizontally about the pivot axis formed by said pivot member.

15. The method of claim 14 and including the step of pinning the front end of said bed to said flat car following horizontal swinging of said bed, said pin and said pivot member acting together to restrict horizontal shifting of said bed relative to said flat car.

References Cited in the file of this patent

UNITED STATES PATENTS

| | | |
|---|---|---|
| 1,734,303 | Ross | Nov. 5, 1929 |
| 1,968,196 | Francis | July 31, 1934 |
| 2,010,969 | Soulis | Aug. 13, 1935 |
| 2,117,068 | Ludington | May 10, 1938 |
| 2,369,384 | Zubatsky | Feb. 13, 1945 |
| 2,543,295 | McGregor et al. | Feb. 27, 1951 |
| 2,693,889 | Fellabaum | Nov. 9, 1954 |